United States Patent [19]
Bloomberg

[11] Patent Number: 5,467,410
[45] Date of Patent: Nov. 14, 1995

[54] IDENTIFICATION OF A BLANK PAGE IN AN IMAGE PROCESSING SYSTEM

[75] Inventor: Dan S. Bloomberg, Palo Alto, Calif.

[73] Assignee: Xerox Corporation, Stamford, Conn.

[21] Appl. No.: 855,375

[22] Filed: Mar. 20, 1992

[51] Int. Cl.$^6$ ................................................ G06K 9/40
[52] U.S. Cl. ..................... 382/100; 382/180; 382/181; 382/264; 358/462; 358/464; 358/467
[58] Field of Search ................................. 382/1, 10, 61, 382/26, 28, 48, 6, 8, 9, 54, 47; 358/468, 462, 448, 476, 442, 464, 402, 403, 434, 438, 467

[56] References Cited

U.S. PATENT DOCUMENTS

| | | | |
|---|---|---|---|
| 4,503,556 | 3/1985 | Scherl et al. | 358/462 |
| 4,541,116 | 9/1985 | Lougheed | 382/54 |
| 4,893,333 | 1/1990 | Baran et al. | 379/100 |
| 4,933,979 | 6/1990 | Suzuki et al. | 382/61 |
| 4,975,972 | 12/1990 | Bose et al. | 382/8 |
| 5,038,381 | 8/1991 | Nelson | 382/9 |
| 5,048,109 | 9/1991 | Bloomberg et al. | 382/50 |
| 5,065,437 | 11/1991 | Bloomberg | 382/9 |
| 5,129,014 | 7/1992 | Bloomberg | 382/48 |
| 5,131,049 | 7/1992 | Bloomberg et al. | 382/9 |
| 5,136,658 | 8/1992 | Mori | 382/48 |
| 5,144,682 | 9/1992 | Nakamura | 382/26 |
| 5,212,742 | 5/1993 | Normile et al. | 382/49 |
| 5,224,179 | 6/1993 | Denker et al. | 382/27 |
| 5,282,050 | 1/1994 | Ishizuka et al. | 358/476 |
| 5,329,382 | 7/1994 | Mita | 358/448 |

FOREIGN PATENT DOCUMENTS

| | | | |
|---|---|---|---|
| 398185A2 | 11/1990 | European Pat. Off. | H04N 1/32 |
| 431961A2 | 6/1991 | European Pat. Off. | G06F 15/62 |
| 0431961 | 12/1991 | European Pat. Off. | G06F 15/62 |
| 62-272751 | 11/1987 | Japan | H04N 1/32 |
| 63-95578 | 4/1988 | Japan | G06F 15/40 |
| 63-242060 | 10/1988 | Japan | H04N 1/21 |

OTHER PUBLICATIONS

Paul S. Heckbert, "A Seed Fill Algorithm," *Graphics Gems*, edited by Andrew S. Glassner, pp. 275–277 and 721–722 (Academic Press).

K. Y. Wong et al,, "Document Analysis System," *IBM J. Res. Development*, vol. 26, No. 6, Nov. 1982.

Stanley R. Sternberg, "Biomedical Image Processing," *IEEE*, Jan. 1983.

(List continued on next page.)

Primary Examiner—Leo H. Boudreau
Assistant Examiner—D. R. Anderson
Attorney, Agent, or Firm—Townsend and Townsend and Crew

[57] ABSTRACT

The present invention provides a robust technique for quickly determining whether a binary input image originated as a blank page. The technique provides reliable sensing in the presence of various image and scanner noise in the input image. In broad terms, the invention contemplates reducing the input image with a low threshold, labeling (by size) connected components (8-connected or 4-connected), and performing a threshold analysis. The threshold analysis typically entails size and numerical thresholds, taking into account the characteristic dimensions of expected types of noise. In specific embodiments, the reduction is performed as a textured reduction wherein the image is divided into tiles, and a single row of pixels in each tile is checked to see whether there are any ON pixels. If there are, the corresponding pixel in the reduced image is ON, otherwise it is OFF. Optional morphological operations are performed to remove expected sources of noise (e.g., pepper noise and thin horizontal lines). The invention further recognizes that a faxed page may contain vertical streaks that are not part of the original paper document. Thus, the threshold analysis typically allows a certain number of such streaks to be present without concluding that the page is not blank. A further understanding of the nature and advantages of the present invention may be realized by reference to the remaining portions of the specification and the drawings.

4 Claims, 5 Drawing Sheets

OTHER PUBLICATIONS

Petros Maragos, "Tutorial on Advances in Morphological Image Processing and Analysis," *Optical Engineering*, vol. 26, No. 7, Jul 1987.

Robert M. Haralick et al., "Image Analysis Using Mathematical Morphology," *IEEE*, vol. PAM1-9, No. 4, Jul. 1987.

Dan S. Bloomberg, U.S. application Ser. No. 07/449,626, filed Dec. 8, 1989, "Segmentation of Text and Graphics."

Dan S. Bloomberg et al., U.S. application Ser. No. 07/449,263, filed Dec. 8, 1989, "Method and Apparatus for Identification of Type Styles."

Dan S. Bloomberg et al., U.S. application Ser. No. 07/448,774, filed Dec. 8, 1989, "Method and Apparatus for Identification of Document Skew."

Dan S. Bloomberg, U.S. application Ser. No. 07/627,284, filed Dec. 13, 1990, "Segmentation of Handwriting and Machine Printed Text."

Dan S. Bloomberg, U.S. application Ser. No. 07/449,627, filed Dec. 8, 1989, "Image Reduction/Enlargement Technique."

IDENTIFICATION OF A BLANK PAGE IN AN IMAGE PROCESSING SYSTEM

BACKGROUND OF THE INVENTION

The present invention relates generally to computerized image processing, and more specifically to techniques for determining whether an image is substantially blank.

One context that presents some unique challenges to computerized image processing is a form that has been faxed. Consider a scenario where a user instructs a computer to perform jobs based on marks (typically made by hand) in various mark-sense fields on a form. The system is intended to be used remotely, with the user sending the form by fax to a fax modem in the computer. In the event that the user does not have a form, a suitable protocol is for the user to fax a blank page (or a page with a large slash or X) to the computer. The computer would interpret this as a request for a starter form that could be used to request other forms.

What the computer gets, however, is likely to be somewhat removed from a blank image. The image may contain text written across the top of the page by the sending fax, pepper noise (isolated black pixels in white regions, or vice versa), and thin horizontal lines of black pixels in white regions, or vice versa, due to noise on the telephone line. The image is further subject to scanner noise which can manifest itself as vertical black streaks due to opaque material on the scanning platen of the fax machine. For the blank page to be interpreted as such, the computer must be able to distinguish the noise from possible intended information on a form. Additionally, it must do this quickly, since it must perform this screening on every single-page input image. Furthermore, it must do this with finesse, since it would be undesirable to have starter forms sent out in response to input of legitimate content-bearing forms.

SUMMARY OF THE INVENTION

The present invention provides a robust technique for quickly determining whether a binary input image originated as a blank page. The technique provides reliable sensing in the presence of various image and scanner noise in the input image.

In broad terms, the invention contemplates reducing the input image with a low threshold, labeling (by size) connected components (8-connected or 4-connected), and performing a threshold analysis. The threshold analysis typically entails size and numerical thresholds, taking into account the characteristic dimensions of expected types of noise.

In specific embodiments, the reduction is performed as a textured reduction wherein the image is divided into tiles, and a single row of pixels in each tile is checked to see whether there are any ON pixels. If there are, the corresponding pixel in the reduced image is ON, otherwise it is OFF. Optional morphological operations are performed to remove expected sources of noise (e.g., pepper noise and thin horizontal lines). The invention further recognizes that a faxed page may contain vertical streaks that are not part of the original paper document. Thus, the threshold analysis typically allows a certain number of such streaks to be present without concluding that the page is not blank.

A further understanding of the nature and advantages of the present invention may be realized by reference to the remaining portions of the specification and the drawings.

DESCRIPTION OF SPECIFIC EMBODIMENTS

Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

A "solid region" of an image refers to a region extending many pixels in both dimensions within which substantially all the pixels are ON.

A "textured region" of an image refers to a region that contains a relatively fine-grained pattern. Examples of textured regions are halftoned or stippled regions.

"Text" refers to portions of a document or image containing letters, numbers, or other symbols including non-alphabetic linguistic characters.

"Line graphics" refers to portions of a document or image composed of graphs, figures, or drawings other than text, generally composed of horizontal, vertical, and skewed lines having substantial run length as compared to text. Graphics could range from, for example, horizontal and vertical lines in an organization chart to more complicated horizontal, vertical, and skewed lines in engineering drawings.

A "mask" refers to an image, normally derived from an original image, that contains substantially solid regions of ON pixels corresponding to regions of interest in the original image. The mask may also contain regions of ON pixels that don't correspond to regions of interest.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold level T. Reduction with SCALE=N entails dividing the source image into N×N squares of pixels, mapping each such square in the source image to a single pixel on the destination image. The value for the pixel in the destination image is determined by the threshold level T, which is a number between 1 and $N^2$. If the number of ON pixels in the pixel square is greater or equal to T, the destination pixel is ON, otherwise it is OFF.

"Subsampling" is an operation wherein the source image is subdivided into smaller (typically square) elements, and each element in the source image is mapped to a single pixel in the destination image. The destination pixel value is defined by a selected pixel in the source image element. The selection may be predetermined (e.g., upper left pixel) or random.

A "4-connected region" (or "4-connected component") is a set of ON pixels wherein any two pixels in the set can be joined by a path that includes the two pixels and includes only pixels in the set, and each pixel on the path is laterally or vertically adjacent to at least one other pixel on the path. An isolated ON pixel that has no 4-connected neighbors may as a matter of definition be considered a 4-connected region.

An "8-connected region" (or "8-connected component") is a set of ON pixels wherein any two pixels in the set can be joined by a path that includes the two pixels and includes only pixels in the set, and each pixel on the path is laterally, vertically, or diagonally adjacent to at least one other pixel on the path. An ON pixel that has no 8-connected neighbors may as a matter of definition be considered an 8-connected region.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Generalized opening" is a morphological operation that consists of an erosion (using the hits and misses in the SE) followed by a dilation (using only the hits in the SE).

"Closing" is a morphological operation consisting of a dilation followed by an erosion.

For opening, generalized opening, and closing, the result does not depend on the center location of the SE since each operation includes successive complementary operations with the same SE.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

System Overview

Figure 1:
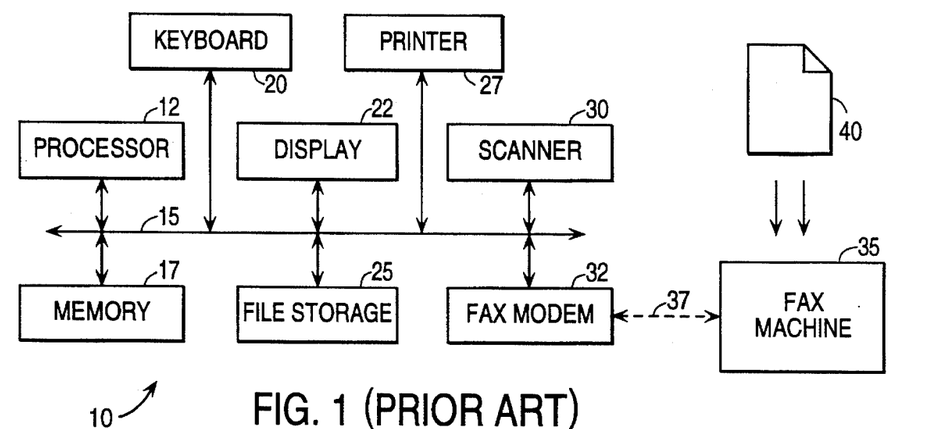
FIG. 1 is a block diagram of a computer system within which the present invention may be embodied.

FIG. 1 is a block diagram of a computer system 10 within which the present invention may be embodied. The computer system configuration illustrated at this high level is standard, and as such, FIG. 1 is labeled prior art. A computer system such as system 10, suitably programmed to embody the present invention, however, is not. In accordance with known practice, the computer system includes a processor 12 that communicates with a number of peripheral devices via a bus subsystem 15. These peripheral devices typically include a memory 17, a keyboard or other input device 20, a display 22, a file storage system 25 such as one or more hard disk drives and floppy disk drives, a printer 27, an optional scanner 30, and a fax modem 32. Fax modem 32 is shown as being in intermittent communication with a fax machine 35, normally considered to be at a remote location, via a telephone line 37 (shown in phantom). It will be appreciated that computer system 10 includes all the elements of a fax machine, and references to a fax machine are generally meant to include such a computer system as well as a self-contained fax machine.

The present invention relates to image analysis, and according to the invention, processor 12, suitably programmed, operates to extract and analyze features in a binary input image. In a typical case, the input image originates from a paper document 40 that was scanned into scanner 30 or that was scanned into fax machine 35 and communicated to fax modem 32 over phone line 37. In a case where fax machine 35 is a computer with a fax modem, the input image could also have been generated on that computer and faxed to fax modem 32.

The encoding of an input bitmap, the transmission of the encoded file to another fax machine, and the decoding into an output bitmap occur according to a standard facsimile protocol, such as the CCITT group 3 or group 4 encoding formats. From the point of view of the present invention, what is referred to above as the output bitmap is considered the binary input image. It is contemplated that document 40 may well have been received at fax machine 35 as a blank form to be filled in by a user.

Invention Overview

Figure 2:
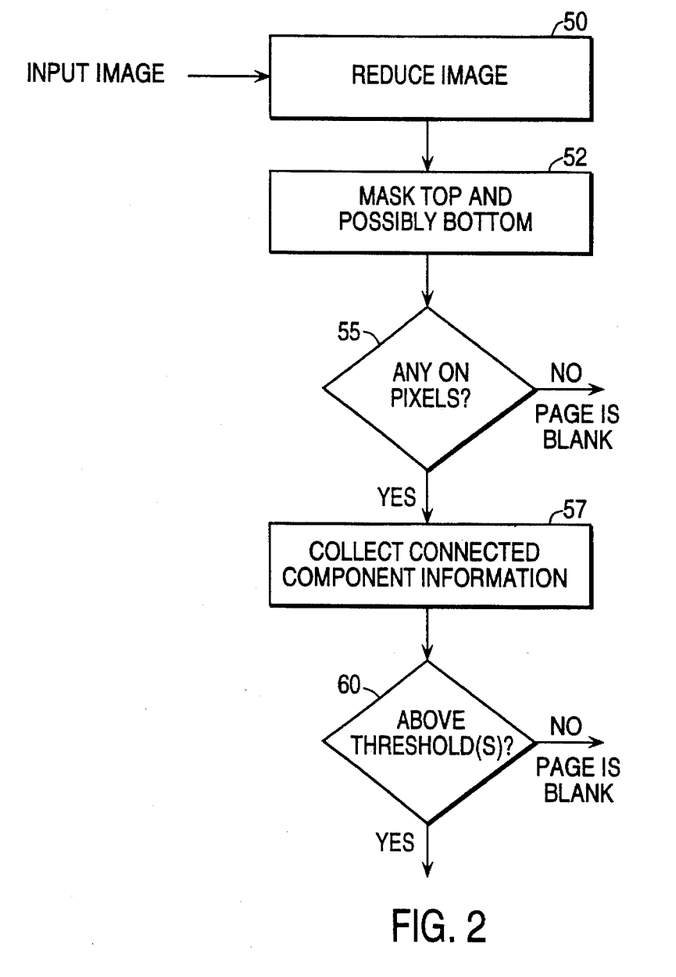
FIG. 2 is a flow diagram showing the method of the present invention for determining whether an input image originated as a blank page.

FIG. 2 is a diagram showing a representative sequence of operations for carrying out the present invention. The present invention seeks to determine whether a page is blank, subject to the possibility that one or more large hand-drawn marks are permitted or required. Since the input image is typically the result of a fax transmission, the technique takes into account the types of noise and artifacts that are characteristic of such transmissions.

The scanned image is first reduced (step 50) by an amount that permits rapid processing in the remaining stages. A reduction factor between 8× and 32× is typical with 16× being presently preferred. ON pixels in the top 160 (and optionally the bottom 160) scan lines at full scale (10 scan lines at 16× reduction) are masked (step 52) i.e., removed without regard to content. This eliminates the text that most fax machines put at the top (or possibly at the bottom) of a faxed page. The resulting image may be tested to see if there are any remaining ON pixels (optional test 55). If not, the page is considered to be blank, assuming that the definition of a "blank page" does not require the presence of a large hand-drawn mark.

Assuming that there are ON pixels, or that test 55 was not performed, information is collected (step 57) as to the number and sizes of connected components. The connected component information is analyzed and various attributes compared to one or more thresholds (test 60). If none of the relevant connected component attributes exceeds the threshold(s), the page is considered blank. As will be discussed below, the relevant information and threshold depend on whether the definition of "blank page" permits or requires the presence of a large mark. If any of the relevant connected component attributes exceeds the threshold, the image is considered not to be a blank page, and is typically subjected to further processing to extract information from the image.

Image Reduction

As noted above, a fast implementation requires a reduction at an early stage. Although there are a number of techniques for performing a suitable reduction, a presently preferred technique is that described in a commonly owned application, filed concurrently with this application, titled "USE OF FAST TEXTURED REDUCTION FOR DISCRIMINATION OF DOCUMENT IMAGE COMPONENTS" (inventor Dan S. Bloomberg, now U.S. Pat. No. 5,434,953), the disclosure of which is incorporated by reference. In brief, the preferred reduction entails subdividing the image into tiles (in this case, 16×16 pixels), and setting the value of the corresponding single pixel in the reduced image on the basis of whether a predetermined subset of pixels in the tile meet a threshold condition. A particularly efficient implementation is to take the first row of pixels in the tile: if at least one pixel in the row is ON, the pixel in the reduced image is ON; if no pixels are ON, the pixel in the reduced image is OFF. This is referred to as a horizontally prefiltered textured reduction with a threshold of 1.

Other possible techniques for reducing the image, such as a sequence of 2× thresholded reductions can also be used. Specific techniques for implementing such reductions are described in copending commonly-owned application Ser. No. 449,627, filed Dec. 8, 1989 now abandoned, titled "IMAGE REDUCTION/ENLARGEMENT TECHNIQUE," the disclosure of which is incorporated by reference. Optimizations for the 2×2 reduction case include the use of logical operations between rows of columns, the use of lookup tables to implement column operations, and special hardware. It is also possible to perform the reduction by using standard subsampling, namely selecting a particular pixel in each tile and using that pixel's value for the value of the corresponding pixel in the reduced image.

Connected Component Analysis

Figure 3A:
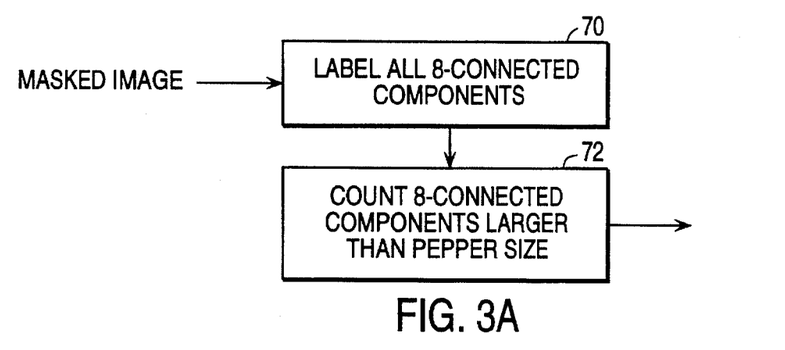
FIGS. 3A and 3B are flow diagrams showing techniques for collecting 8-connected component information.
Figure 3B:
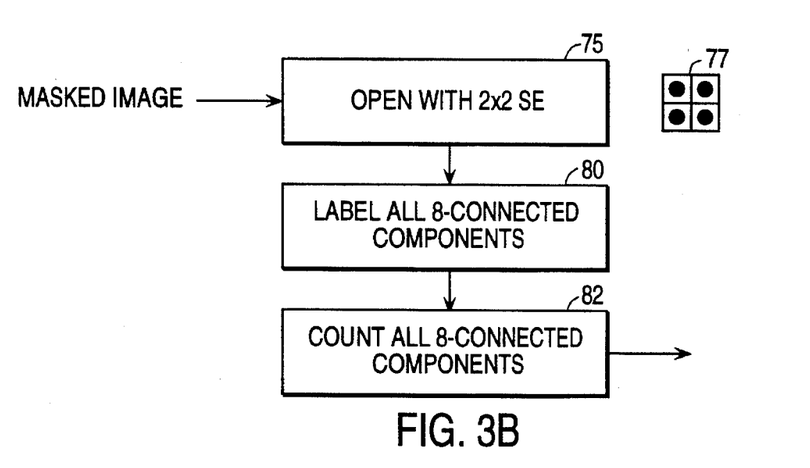
Figure 4A:
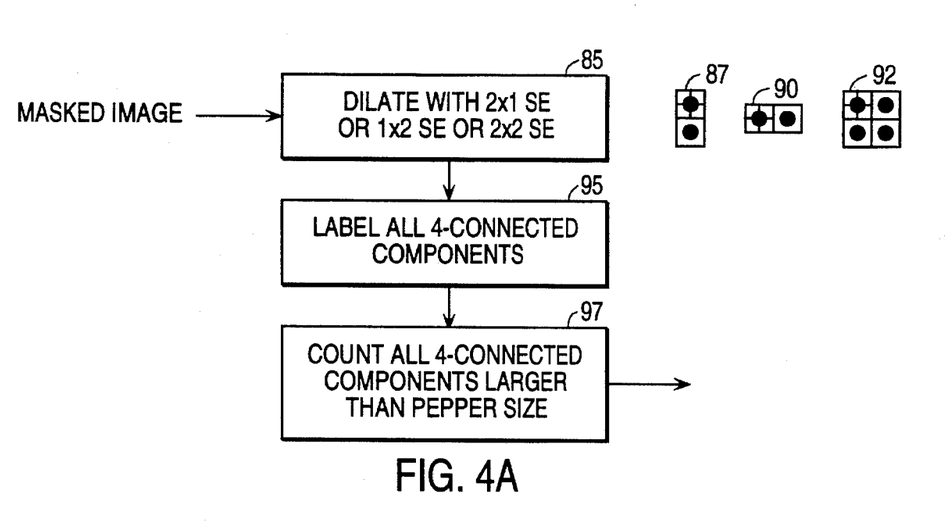
FIGS. 4A and 4B are flow diagrams showing techniques for collecting 4-connected component information.
Figure 4B:
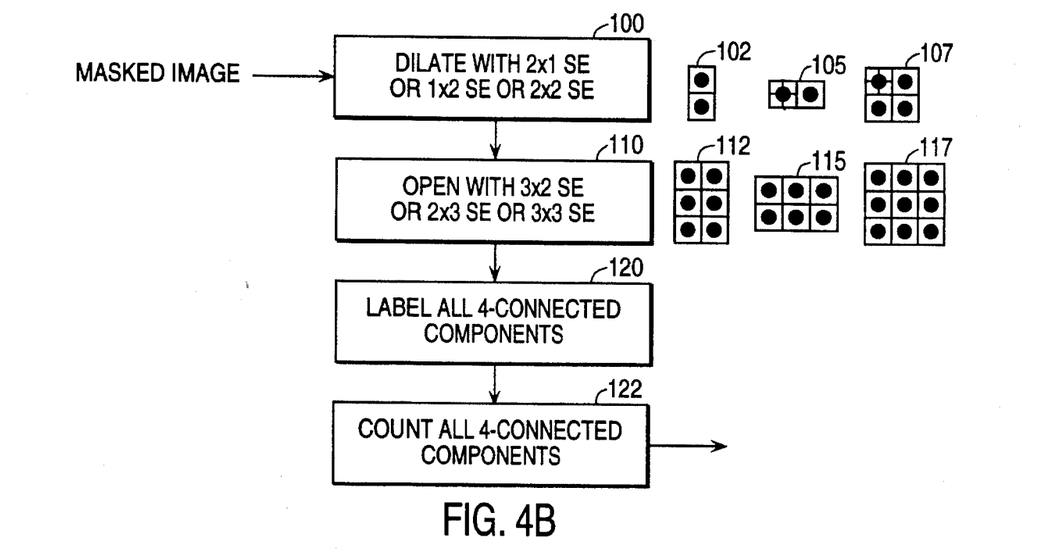

FIGS. 3A and 3B are flow diagrams illustrating alternative techniques for performing step 57 where the analysis is in terms of 8-connected components. FIGS. 4A and 4B are flow diagrams corresponding generally to FIGS. 3A and 3B, but where the analysis is in terms of 4-connected rather than 8-connected components. At 16× reduction, any connected component smaller than 2×2 pixels is considered pepper noise. In all instances, pepper noise is eliminated or ignored, and its presence does not enter into the ultimate determination.

In the technique of FIG. 3A, all 8-connected components are labeled (step 70). This entails determining the locations and sizes of the smallest enclosing rectangle (bounding box) for each 8-connected component. Next, the number of 8-connected components having a size larger than pepper-noise size is determined (step 72). This threshold may be 2×2. In the technique of FIG. 3B, the masked image is first opened with a 2×2 solid SE 77, which has the effect of removing pepper noise and one-pixel thick horizontal lines, which can be generated by noise on the phone line. Then, all 8-connected components are labeled (step 80), and counted (step 82).

In the technique of FIG. 4A, the masked image is first dilated (step 85) with either a vertical 2×1 SE 87, a horizontal 1×2 SE 90, or a 2×2 SE 92. This dilation converts all 8-connected components to 4-connected components. All 4connected components are then labeled (step 95), and counted (step 97). Given that the image was dilated with one of SE's 87, 90, and 92, the threshold size for pepper-noise (assumed above to be 2×2) would be 3×2, 2×3, or 3×3, depending on which size SE was used for the dilation. In the technique of FIG. 4B, the image is dilated (step 100) with a vertical 2×1 SE 102, a horizontal 1×2 SE 105, or a 2×2 SE 107. The dilated image is then opened (step 110) with a 3×2 SE 112, a 2×3 SE 115, or a 3×3 SE 117, depending on which SE was used for the dilation. The 4-connected components are then labeled (step 120) and counted (step 122).

Although the invention works well for both cases, the software for labeling 4-connected components is generally simpler than that for labeling 8-connected components. Therefore, from an implementation point of view, the techniques of FIGS. 4A and 4B are preferred.

Figure 5:
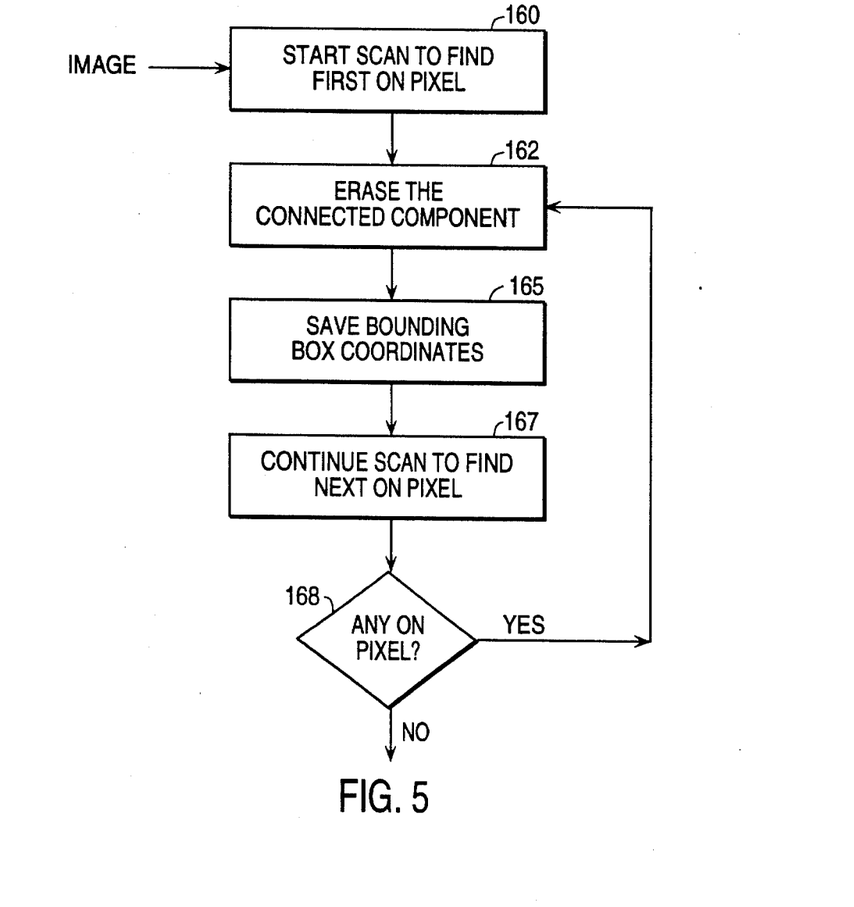
FIG. 5 is a flow diagram showing a technique for determining bounding box locations.

FIG. 5 is a flow diagram showing a technique for extracting coordinate information on 4-connected components in the reduced image. A copy of the reduced image is scanned by the computer (i.e., each pixel is evaluated), starting at the upper left and proceeding from left to right and top to bottom until an ON pixel is found (step 160). The coordinates of that pixel are saved, and initially represent the current best information regarding the corners of the bounding box of the connected component to which the found pixel belongs (the bounding box is fully specified by its upper left and lower right corners). The found pixel and all its 4-connected neighbors are turned OFF (step 162). As each pixel is turned OFF, its coordinates are compared with the current corner coordinates. If either coordinate is outside the range of the current bounding box, the appropriate corner coordinate(s) are updated to enlarge the now-current bounding box. The technique for finding and turning off the 4-connected neighbors is described in Paul S Heckbert, "A Seed Fill Algorithm," pages 275–277 and 721–722 of "Graphics Gems," edited by Andrew S. Glassner (Academic Press, Inc. 1990).

Once a connected component has been erased and its bounding box coordinates saved (step 165), the scan begins again (step 167), starting immediately past the position where the first pixel in the just-erased component was found. If another ON pixel is found (test 168), the sequence starting at step 162 is repeated. Once the resumed scan fails to find an ON pixel, the procedure is complete, and the relevant bounding box information can be extracted.

Threshold Analysis

As discussed above, the input image is reduced and subjected to a number of operations that provide information regarding the size and location of connected components in the reduced image. If the techniques of FIGS. 3B or 4B, which use morphological operations to remove pepper noise and thin horizontal lines, are applied, those sources of noise will not be part of the connected component information. In any event, what is relevant is information regarding connected components whose bounding boxes have both dimensions larger than the characteristic dimensions of the noise.

An additional source of noise that is relevant to the threshold analysis is the vertical streaks that result from dirt on the scanning platen. Such streaks are typically less than about 0.2 inches wide, which corresponds to about 40 pixels at full resolution of 200 dpi, or about 3 pixels at 16× reduction. The presence of a relatively small number (say on the order of 5) of such streaks should normally not disqualify an otherwise blank page from being considered blank, but that is a matter of design choice, and the criterion may be stricter or looser if desired.

Thus a typical test for a blank page is that there be no more than a certain number of connected components larger in either dimension than pepper noise, so long as none are wider than the expected streak width or higher than the expected height of horizontal lines due to phone line noise. This test can be implemented by simply checking that there are no connected components wider than 3 pixels (4 pixels if the image was dilated with a 1×2 or 2×2 SE) and higher than 1 pixel (2 pixels if the image was dilated with a 2×1 or 2×2 SE).

Alternatively, the test can be implemented by opening the image with a 1×4 or 1×5 horizontal SE before labeling the connected components, thereby eliminating the vertical streaks, and checking that there are no connected components higher than the expected height for phone line noise. Opening to remove the streaks is preferred if the image was not previously opened to remove thin horizontal lines. The reason for this is that if the image contains a thin horizontal line and a vertical streak that intersect, the two will show up as a large connected component unless one or the other is removed before the connected components are labeled.

Variations on the above tests can be formulated if it is desired to allow or require that the user place a large slash or X on the page. In such an instance, the test would require that there be no more than, or exactly, a particular non-zero number of large connected components.

Specific Embodiments

Figure 6:
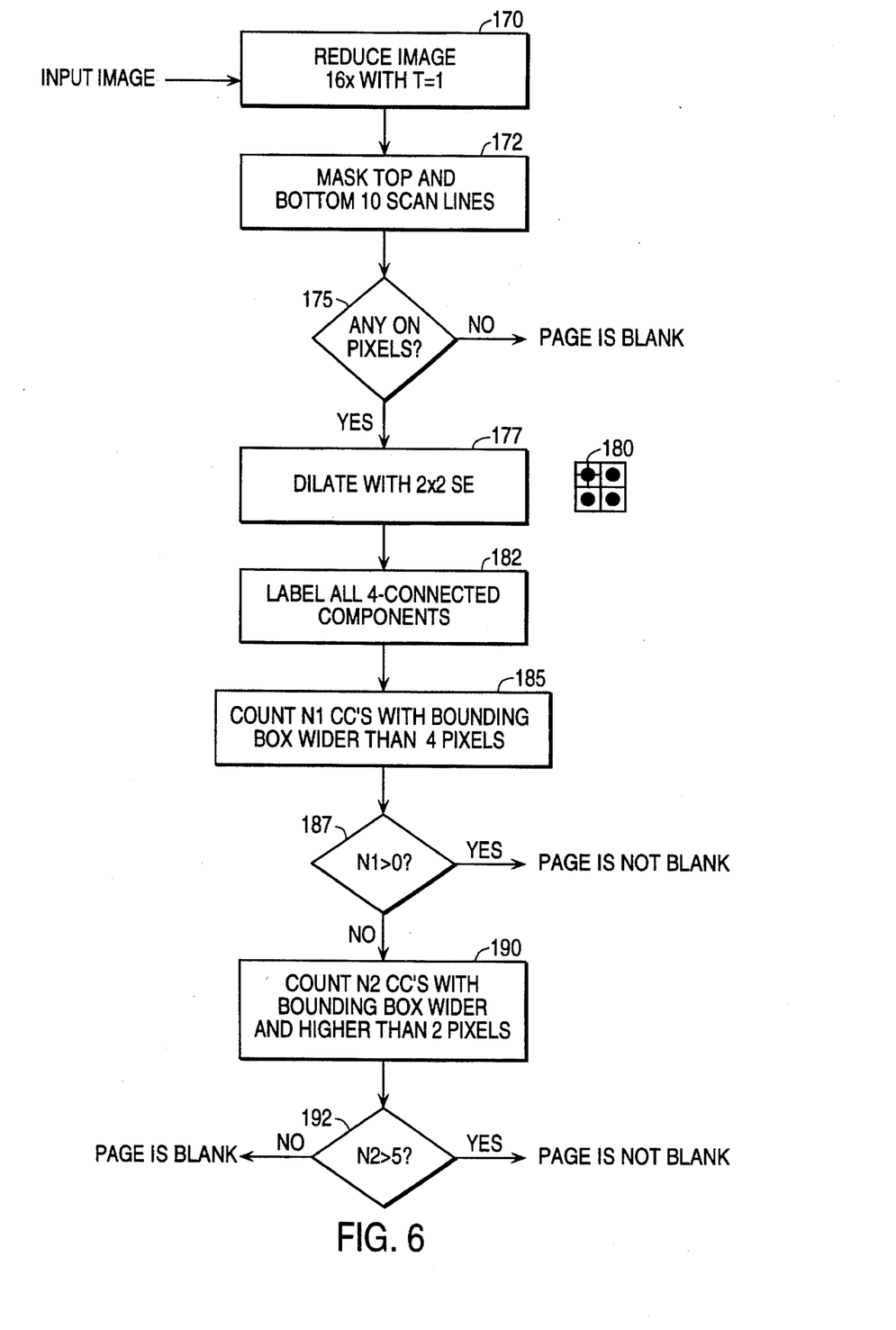
FIG. 6 is a flow diagram showing a present implementation of the invention.

FIG. 6 is a flow diagram illustrating a specific sequence of operations for carrying out a current embodiment of the present invention. This embodiment does not allow large marks. The scanned image is first reduced (step 170) by a reduction factor of 16× using a horizontal prefiltered textured reduction. The top and bottom 10 scan lines are masked (step 172), and the resulting image is tested to see if there are any remaining ON pixels (test 175). If there are none, the page is considered blank. Otherwise, processing continues.

The image is dilated (step 177) with a 2×2 SE 180, and all 4-connected components are labeled (step 182). The number (N1) of components with bounding boxes wider than four pixels (a size threshold for vertical streaks) is counted (step 185), and this number is compared to zero (test 187). If N1 is greater than zero, the page is considered not blank. Note that this embodiment would accept as possibly blank an image with vertical streaks but would reject (consider not blank) an image with one or more thin (one pixel high) horizontal lines. If N1 is not greater than zero, the number (N2) of connected components with bounding boxes wider and higher than two pixels is counted (step 190). Single-pixel pepper noise lines does not count here, but most vertical streaks probably do. N2 is compared (test 192) with a numerical threshold (in this case 5), and if N2 exceeds the threshold, the page is considered not blank. If there are five or fewer such components, the page is considered blank.

Figure 7:
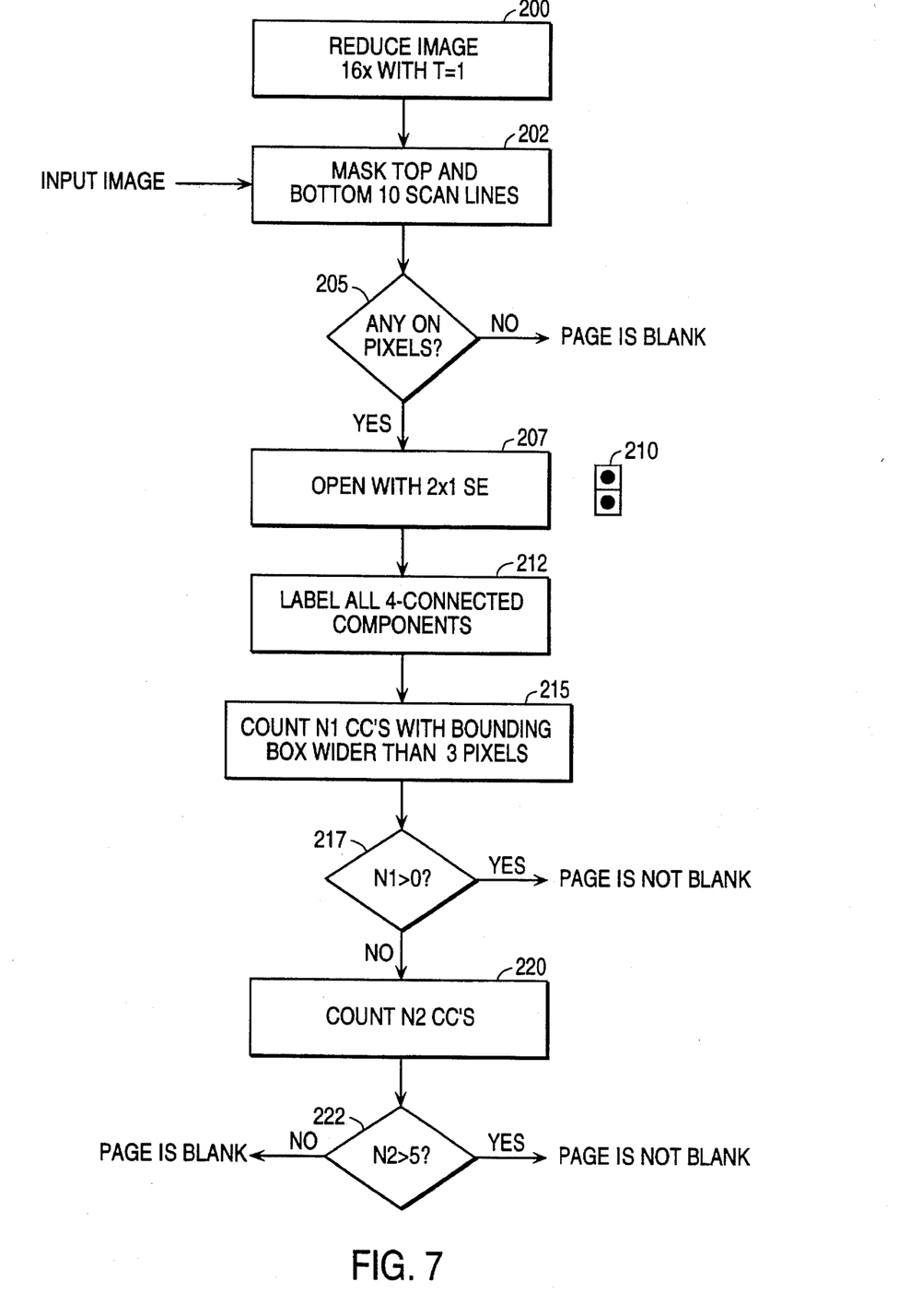
FIG. 7 is a flow diagram showing a possibly preferred implementation of the invention.

FIG. 7 is a flow diagram illustrating a specific sequence of operations for carrying out what is believed to be a preferred embodiment of the present invention. The sequence includes a reduction step 200, a masking step 202, and a test 205 as in the previously described embodiment. The image is then opened (step 207) with a 2×1 vertical SE 210, which has the effect of removing 1×1 pepper noise and horizontal lines that are one pixel high. 4-connected components are labeled (step 212), and the number (N1) of such components with bounding boxes wider than four pixels is determined. If N1 is greater than zero the page is considered not blank (test 217). Otherwise, the total number (N2) of connected components is determined (step 220) and compared to a threshold (in this case 5). If N1 is greater than five, the page is considered not blank. Otherwise, it is considered blank.

Discussion of the Software

A current embodiment of the invention is implemented in software on a personal computer. Source code in the C language for performing the various types of morphological operations on a Sun Workstation is disclosed in U.S. Pat. No. 5,065,437, titled "IDENTIFICATION AND SEGMENTATION OF FINELY TEXTURED AND SOLID REGIONS OF BINARY IMAGES," the disclosure of which is incorporated by reference.

Conclusion

In summary it can be seen that the present invention provides a robust technique for determining whether a scanned image originated as a blank page. The technique takes into account the various types of scanner and transmission noise that are likely to be present in a faxed document.

While the above is a complete description of the preferred embodiments of the invention, various alternatives and equivalents may be used. For example, the reduction operation, carried out before labelling connected components, could include subjecting copies of the input image to vertically and horizontally prefiltered textured reduction operations and logically ORing the results. Therefore, the above description and illustrations should not be taken as limiting the scope of the invention which is defined by the claims.

What is claimed is:

1. A method for eliminating streaks from consideration in the analysis of whether an electronic representation of a page generated from a scanning system is blank, wherein the method executes on a computer system, wherein the computer system includes a processor coupled to a memory, wherein the memory includes the electronic representation of the page, the method comprising the steps of:

predetermining a streak width value and storing the streak width value in the computer system;

using the processor to determine the number and connectivity of pixels in the electronic representation and to designate pixels meeting a predetermined connectivity criterion as connected components;

using the processor to eliminate the number of connected components smaller in both dimensions than predetermined dimension values;

if any of the remaining connected components have a width dimension larger than the predetermined streak width value then using the processor to indicate that the page is not blank else if the number of remaining connected components is not larger than a predetermined allowed number then using the processor to indicate that the page is blank.

2. The method of claim 1, wherein the predetermined allowed number is 5.

3. The method of claim 1, wherein the predetermined streak width value is about 0.2 inches.

4. The method of claim 1, wherein the predetermined dimension values are the dimensions of expected noise in the electronic representation.

* * * * *